United States Patent
Nazari et al.

(10) Patent No.: US 12,282,676 B2
(45) Date of Patent: Apr. 22, 2025

(54) RECOVERY OF CLUSTERED STORAGE SYSTEMS

(71) Applicant: NVIDIA CORPORATION, Santa Clara, CA (US)

(72) Inventors: Siamak Nazari, Mountain View, CA (US); David Dejong, Fremont, CA (US); Srinivasa Murthy, Cupertino, CA (US); Shayan Askarian Namaghi, San Jose, CA (US); Roopesh Tamma, San Ramon, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/116,740

(22) Filed: Mar. 2, 2023

(65) Prior Publication Data

US 2023/0273742 A1 Aug. 31, 2023

Related U.S. Application Data

(63) Continuation-in-part of application No. 18/115,211, filed on Feb. 28, 2023.

(60) Provisional application No. 63/314,987, filed on Feb. 28, 2022, provisional application No. 63/314,996, filed on Feb. 28, 2022, provisional application No.
(Continued)

(51) Int. Cl.
*G06F 3/06* (2006.01)

(52) U.S. Cl.
CPC ............ *G06F 3/065* (2013.01); *G06F 3/0623* (2013.01); *G06F 3/0667* (2013.01); *G06F 3/0683* (2013.01)

(58) Field of Classification Search
CPC .... G06F 3/0608; G06F 3/0623; G06F 3/0641; G06F 3/065; G06F 3/067; G06F 3/0683; G06F 11/1446; G06F 11/1451; G06F 11/1469; G06F 2201/84
USPC .......................................................... 711/111
See application file for complete search history.

(56) References Cited

U.S. PATENT DOCUMENTS 7,827,350 B1 * 11/2010 Jiang .................... G06F 11/1469
707/649
8,326,803 B1 * 12/2012 Stringham ............... G06F 3/065
707/821
(Continued)

FOREIGN PATENT DOCUMENTS

| CN | 112416860 A | * | 2/2021 | .......... G06F 11/1448 |
| WO | WO-2021150563 A1 | * | 7/2021 | .......... G06F 11/1451 |
| WO | WO-2021150576 A1 | * | 7/2021 | ............ G06F 16/215 |

OTHER PUBLICATIONS

Machine translation of CN 112416860 (Year: 2021).*
(Continued)

*Primary Examiner* — Reginald G Bragdon
*Assistant Examiner* — Aaron D Ho
(74) *Attorney, Agent, or Firm* — Hogan Lovells US LLP

(57) ABSTRACT

A cluster storage system takes snapshots that are consistent across all storage nodes. The storage system can nearly instantaneously promote a set of consistent snapshots to their respective base volumes to restore the base volumes to be the same as the snapshots. Given these two capabilities, users can restore the system to a recovery point of the user's choice, by turning off storage service I/O, promoting the snapshots constituting the recovery point, rebooting their servers, and resuming storage service I/O.

18 Claims, 2 Drawing Sheets

Related U.S. Application Data

63/314,970, filed on Feb. 28, 2022, provisional application No. 63/316,081, filed on Mar. 3, 2022.

(56) References Cited

U.S. PATENT DOCUMENTS

| | | | |
|---|---|---|---|
| 8,886,995 B1* | 11/2014 | Pallapothu | G06F 11/1405 |
| | | | 714/15 |
| 9,588,847 B1* | 3/2017 | Natanzon | G06F 11/1458 |
| 9,842,117 B1* | 12/2017 | Zhou | G06F 16/128 |
| 10,514,989 B1* | 12/2019 | Borodin | G06F 11/1464 |
| 11,307,935 B2* | 4/2022 | Keller | G06F 11/1464 |
| 11,327,844 B1 | 5/2022 | Aquino et al. | |
| 11,620,070 B2 | 4/2023 | Balasubramanian et al. | |
| 2004/0250033 A1* | 12/2004 | Prahlad | G06F 3/065 |
| | | | 711/162 |
| 2009/0013012 A1* | 1/2009 | Ichikawa | G06F 11/1464 |
| 2010/0179959 A1* | 7/2010 | Shoens | G06F 16/128 |
| | | | 707/E17.014 |
| 2010/0299309 A1 | 11/2010 | Maki et al. | |
| 2012/0317079 A1* | 12/2012 | Shoens | G06F 11/2094 |
| | | | 707/E17.007 |
| 2013/0166863 A1* | 6/2013 | Buragohain | G06F 11/1482 |
| | | | 711/E12.103 |
| 2014/0258239 A1* | 9/2014 | Amlekar | G06F 11/1402 |
| | | | 707/649 |
| 2015/0286695 A1* | 10/2015 | Kadayam | G06F 16/27 |
| | | | 707/639 |
| 2016/0132396 A1* | 5/2016 | Kimmel | G06F 16/2228 |
| | | | 714/6.3 |
| 2016/0205182 A1* | 7/2016 | Lazar | G06F 3/067 |
| | | | 709/219 |
| 2017/0031769 A1* | 2/2017 | Zheng | G06F 3/065 |
| 2017/0123657 A1* | 5/2017 | B | G06F 3/065 |
| 2017/0123700 A1* | 5/2017 | Sinha | G06F 3/065 |
| 2020/0272544 A1* | 8/2020 | Carvelli | G06F 16/907 |
| 2020/0341855 A1* | 10/2020 | Tanwer | G06F 11/1464 |
| 2020/0379646 A1* | 12/2020 | Blau | G06F 11/301 |
| 2021/0133328 A1* | 5/2021 | Wu | G06F 8/65 |
| 2021/0216408 A1* | 7/2021 | Huskisson | G06F 3/0653 |
| 2021/0224161 A1 | 7/2021 | Wang | |
| 2022/0263897 A1* | 8/2022 | Karr | G06F 11/1471 |
| 2022/0350492 A1* | 11/2022 | Beedu | G06F 3/067 |
| 2023/0132591 A1* | 5/2023 | Karr | G06F 16/128 |
| | | | 711/162 |
| 2023/0325285 A1 | 10/2023 | O'Connor et al. | |

OTHER PUBLICATIONS

Non-Final Office Action issued in U.S. Appl. No. 18/115,211, dated Jun. 5, 2024.

Final Office Action issued in U.S. Appl. No. 18/115,211, dated Oct. 23, 2024.

\* cited by examiner

RECOVERY OF CLUSTERED STORAGE SYSTEMS

CROSS-REFERENCE TO RELATED APPLICATIONS

This patent document is a continuation-in-part and claims benefit of the earlier filing date of U.S. patent application Ser. No. 18/115,211, filed Feb. 28, 2023, which benefit of the earlier filing date of U.S. provisional Pat. App. No. 63/314,970, filed Feb. 28, 2022, U.S. provisional Pat. App. No. 63/314,987, filed Feb. 28, 2022, U.S. provisional Pat. App. No. 63/314,996, filed Feb. 28, 2022, and U.S. provisional Pat. App. No. 63/316,081, filed Mar. 3, 2022, all of which are hereby incorporated by reference in their entirety.

BACKGROUND OF THE INVENTION

Enterprise class storage systems may provide many storage services, such as reading and writing of data to volumes, compression of data being written and decompression of data being read, deduplication to identify duplicated data and improve storage efficiency, and snapshotting volumes to permit recovery of volumes to prior states. Many of these storage systems use a cluster architecture including multiple storage nodes to enhance fault-tolerance if a storage device fails. In many cases, a storage user can provision virtual volumes in different storage nodes for data storage for their applications.

Some applications use multiple volumes for storage purposes and have dependencies that span multiple volumes. For example, a database application may use a log volume to store a write-ahead log and use one or more data volumes to store data. Such a database application may write a transaction to a write-ahead log and then write data corresponding to the transaction to a data volume. Such writes are sometimes referred to as dependent writes. Snapshots of volumes, which may be taken for recovery purposes, need to fully capture dependent writes. For example, a snapshot of the log volume of a database application is taken before the log write, but a snapshot of the data volume is taken after the data write, the snapshots would be mutually inconsistent. An enterprise storage system may thus need to provide consistent snapshot capabilities across storage volumes that may be on different storage nodes. Even if a cluster storage system provides consistent point-in-time snapshotting, a storage user may still face the problem of how to restore a storage system to a consistent state after the storage system has been corrupted (possibly by malware such as ransomware). System restoration may be more difficult when the hosts for a corrupted storage system boot from volumes provisioned on the corrupted storage system. The corruption can make the boot volumes unusable, rendering the hosts inoperable.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Figure 1:
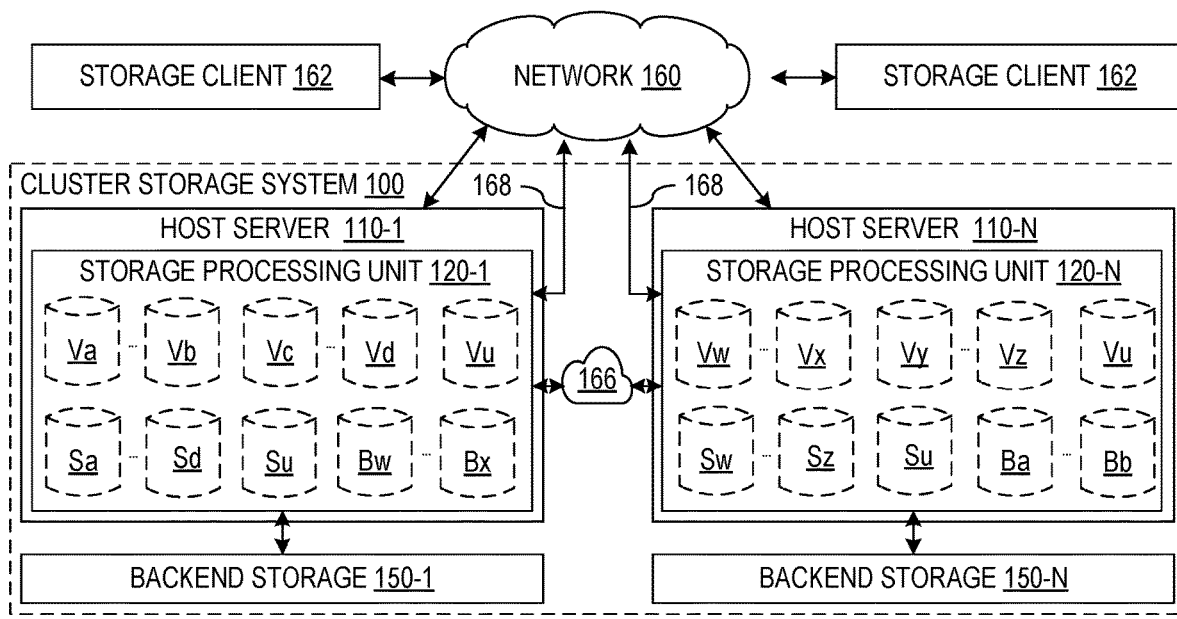
FIG. 1 is a block diagram of a cluster storage system in accordance with an example of the present disclosure.

Malware and unintentional software problems can corrupt data in storage systems, and storage users need to be able to deal with such corruption. Some prior solutions may cause storage service outages lasting days to recover a storage system or recover data from a storage system after an attack has occurred. Systems and methods disclosed here provide the ability to recover a clustered storage system to a consistent state in a fast and reliable manner.

A storage system in accordance with one example of the present disclosure can take snapshots consistently across all storage nodes and can, when needed, nearly-instantaneously promote consistent snapshots to their respective base volumes, thereby restoring the base volumes to be the same as the consistent snapshots. Given these capabilities, a user can restore a storage system to a recovery point of the user's choice, by turning off or suspending storage service I/O of the storage system, promoting a set of snapshots constituting the desired recovery point, rebooting the storage nodes, e.g., rebooting host servers of the storage nodes, and then turning on or resuming the storage service I/O of the storage system, Resuming storage services after rebooting avoids having the promoted volumes corrupted again by the not yet rebooted host running malware.

In accordance with one example of the present disclosure, a fast and reliable mechanism restores a clustered storage system to a consistent recovery point, for example, after a malware or ransomware attack. After detecting such an attack and deciding that the system needs to be restored to a prior consistent point, the storage system may present a user with a set of recovery points from which to choose. A recovery point may correspond to a set of snapshots taken at the same time, e.g., an hour back, a day back, or a week back.

A cluster system may take consistent system-wide snapshots periodically or according to a user-defined or user-selected schedule. A user or administrator of the storage system may decide the periodicity of the system-wide snapshots, sometimes referred to herein as scheduled snapshots. Scheduled snapshots may automatically expire after a given elapsed time or according to a schedule. As an example, a user of a storage system might set up a schedule that takes a set of snapshots every fifteen minutes and expires each set of snapshots after an hour from the time that the set of snapshots were created. In which case, each base volume in the storage system always has four snapshots that were created within the last hour. The user might alternatively or additionally have another schedule that takes snapshots every day and expires the daily snapshots after a week. In which case, the user will have daily snapshots of the last seven days. Such snapshots constitute recovery points going back every 15 minutes within the last hour or every day within the last week. All the nodes of the clustered storage system may capture the scheduled snapshots at the same time provided storage nodes of the cluster are synchronized using a mechanism such as Network Time Protocol (NTP). NTP is a networking protocol for clock synchronization between computer systems over packet-switched, variable-latency data networks.

FIG. 1 is a block diagram illustrating a cluster storage system 100 in accordance with an example of the present disclosure. Storage system 100 includes user hardware including one or more host servers 110-1 to 110-N, which are generically referred to herein as host server(s) 110. Each host server 110 may be a conventional computer or other computing system including one or more central processing unit (CPU), memory, and interfaces for connections to internal or external devices. One or more service or storage processing units (SPUs) 120-1 to 120-N, which are generically referred to herein as SPU(s) 120, are installed in host servers 110. Each SPU 120 may control a storage node of cluster storage system 100. In general, storage system 100 may include any number of host servers 110, with each server 110 hosting one or more SPUs 120. For redundancy, storage system 100 may include at least two host servers 110 and at least at least two storage processing units 120. In general, storage system 100 is scalable by adding more hosts 110 and SPUs 120 with associated backend storage.

Each SPU 120 may provide storage services to host servers 110 and storage clients 162 via virtual volumes or LUNs, sometimes generically referred to herein as virtual volumes V. FIG. 1 particularly shows SPU 120-1 provides storage services relating to a set of shared and unshared base volumes Va to Vb, Vc to Vd, and Vu and shows SPU 120-N provides storage services relating to virtual volumes Vw to Vx, Vy to Vz, and Vu. SPU 120-1 is sometimes referred to as "owning" shared volumes Va to Vb and Vc to Vd in that SPU 120-1 is normally responsible for fulfilling I/O requests that are directed at any of volumes Va to Vb and Vc to Vd. Similarly, SPU 120-N may be the owner of shared volumes Vw to Vx and Vy to Vz in that SPU 120-N is normally responsible for fulfilling I/O requests that are directed at any of volumes Vy to Vz.

Each base virtual volume may be a "mirrored" or "unmirrored" volume with each mirrored volume having a backup virtual volume kept somewhere in cluster storage system 100, preferably the base volume and backup volume being in different storage nodes. In FIG. 1, SPU 120-1 maintains backup volumes Bw to Bx that respectively copy mirrored virtual volumes Vw to Vx that SPU 120-N owns, and SPU 120-N maintains backup volumes Ba to Bb that respectively copy mirrored virtual volumes Va to Vb that SPU 120-1 owns. Backup volumes Ba to Bb and Bw to Bx may be virtual volumes that are copies of respective base virtual volumes Va to Vb and Vw to Vx and that are used to provide storage services to storage clients when the respective base virtual volumes Va to Vb and Vw to Vx are not available, e.g., if a node is offline or fails. Volumes Vc to Vd and Vy to Vz are "unmirrored," meaning volumes Vc to Vd and Vy to Vz do not have associated backup volumes, but base virtual volumes Vc to Vd and Vy to Vz may be "shared" in that a storage client may access the shared base virtual volumes Vc to Vd and Vy to Vz through any of the servers 110-1 to 110-N or "unshared" in that only the host server can access the unshared volumes. An unshared volume Vu presented by an SPU 120 may be, for example, a boot LUN for the host server 110 containing the SPU 120.

Each SPU 120 controls its backend storage 150, e.g., storage 150-1 to 150-N respectively connected to SPUs 120-1 to 120-N, for storage of data corresponding to the virtual volumes that the SPU 120 owns and the backup volumes that the SPU 120 maintains. In the example of FIG. 1, SPUs 120-1 operates storage 150-1 to store the data associated with base virtual volumes Va to Vb and Vc to Vd, backup volumes Bw to Bx, and any unshared volumes Vu. SPU 120-N operates storage 150-N to store the data associated with base virtual volumes Vw to Vx and Vy to Vz, backup volumes Ba to Bb, and any unshared volumes Vu.

Backend storage 150 may include one or more storage devices installed in the same host server 110 as an associated SPU 120, external storage devices directly connected to its associate SPU 120 or host server 110, or network-connected storage devices. Storage 150 may employ, for example, hard disk drives, solid state drives, or other nonvolatile storage devices or media in which data may be physically stored, and storage 150 particularly may have a redundant array of independent disks (RAID) 5 or 6 configuration for performance and redundancy.

Each SPU 120-1 to 120-N may be installed and fully resident in the chassis of one of host servers 110-1 to 120-n. Each SPU 120 may, for example, be implemented as a card, e.g., a PCI-e card, or printed circuit board with a connector or contacts that plug into a slot in a standard peripheral interface, e.g., a PCI bus in its host server 110.

Multiple SPUs 120, e.g., SPU 120-1 to 120-N in FIG. 1, may be connected using high speed data links, e.g., one or more parallel 10, 25, 50, 100 or more GB/s Ethernet links, to form a data network 166 for a pod or cluster of SPUs 120, e.g., interconnecting a cluster of storage nodes. Data network 166 may directly interconnect the SPUs 120 in a pod or cluster and may be independent of a network 160, e.g., a local or private network or a public or wide area network such as the Internet, connecting host servers 110 and clients 162.

Each SPU 120 may employ a communication link 168 to connect to network 160. In some implementations of storage system 100, client stations 162 may communicate with a host 110 to request storage services. Each client station 162 may be a computer including a processor, memory, and software or firmware for executing a user interface adapted to communicate over local network 160. Client stations 162 in general may be storage clients that require storage services that storage system 100 provides. Network 160 may further include a public network, e.g., the Internet, so that SPUs 120 may communicate with cloud-based management infrastructure (not shown) providing a cloud-based management plane for storage system 100.

Figure 2:
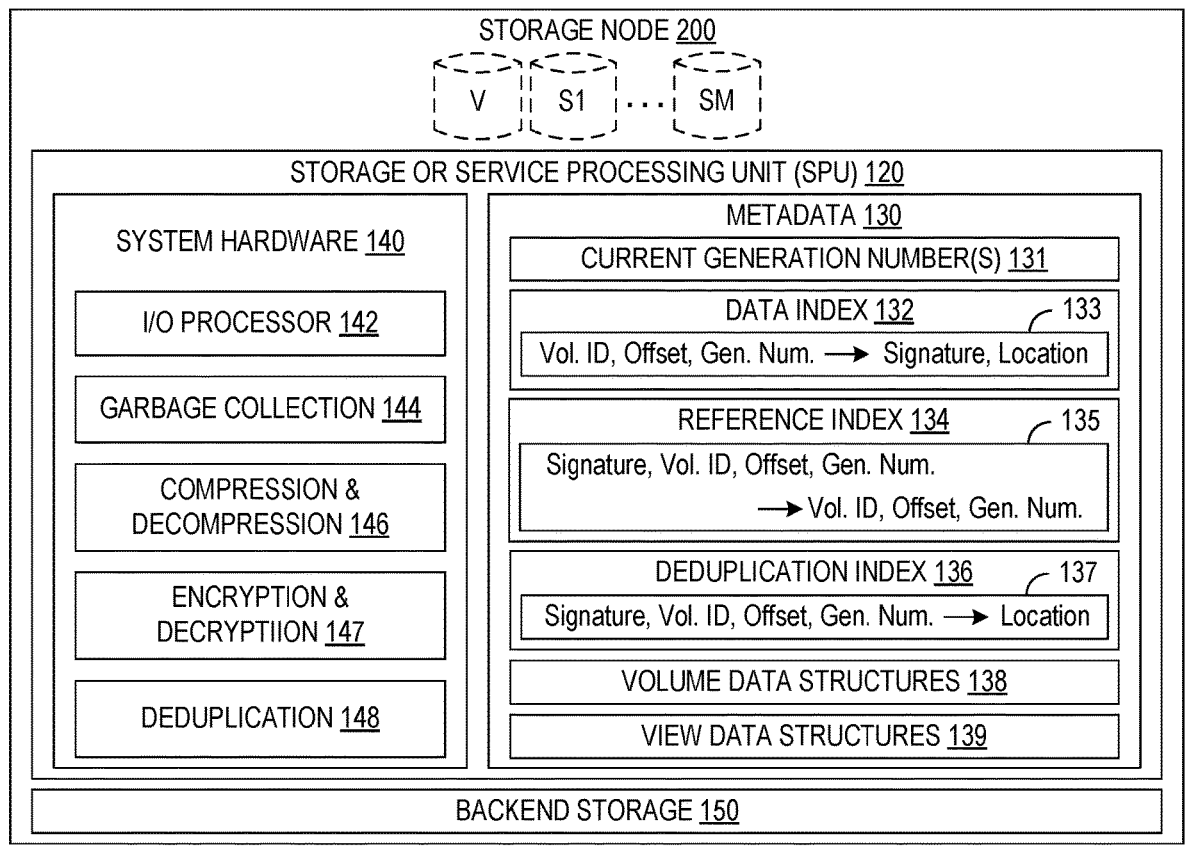
FIG. 2 is a block diagram of a storage node in accordance with an example of the present disclosure.

FIG. 2 is a block diagram illustrating a storage node 200 in accordance with an example of the present disclosure. Storage node 200 may be implemented as a host server 110 containing an SPU 120 as described above. Alternatively, storage node 200 may be implemented as one of multiple SPUs 120 that are resident in and share hardware of a host server 110. In FIG. 2, the SPU 120 in storage node 200 maintains virtual volumes V at least some of which are exported and are available to clients having storage requests such as writing and reading of blocks of data of virtual volumes V. Each of virtual volumes V may be a base virtual volume that is mirrored or unmirrored and may be shared or unshared or may be a backup volume for a base virtual volume stored elsewhere in a storage cluster. Each virtual volume V logically includes a set of pages that may be distinguished from each other, for example, using addresses or offsets within the virtual volume V, and a storage service request from a storage client may specify an address or offset in a target virtual volume V being accessed.

Storage node 200 also maintains M set of synchronized snapshots S1 to SM. Each of synchronized snapshot sets S1 to SM include respective snapshots for all volumes V, and synchronized snapshot sets S1 to SM reflect the states that virtual volumes V had at M times $t_1 \ldots t_M$ corresponding to synchronized snapshot sets S1 to SM.

Storage node 200 performs storage operations that create and use structures in metadata 130 to avoid the need to copy data when taking snapshots of virtual volumes V. In particular, for a storage operation that changes data in a virtual volume V, storage node 200 assigns a generation number to the storage operation and does not overwrite old data in backend storage 150, instead storage node 200 only writes incoming data to unused physical locations, i.e., physical addresses that SPU previously designated as being empty, in backend storage 150. As a result, the older versions of data are not overwritten and therefore may remain available for snapshots. If the same page or offset in any virtual volumes V is written to multiple times, multiple different versions of the page may be stored in different physical locations in backend storage 150, and different generation numbers that SPU 120 assigned to the respective versions of the virtual page distinguish the different versions of the page. Most read-type storage services for a page in a virtual volume V only need the newest page version, e.g., the page version with the newest generation number. A snapshot S of a virtual volume V generally needs the version of each page which has the highest generation number in a range between a generation number at the creation of the virtual volume V and the generation number given to the snapshot S at the creation of the snapshot S. Page versions that do not correspond to any virtual volume V or any snapshot S are not needed, and SPU 120 may perform garbage collection to remove unneeded pages and to free storage space in backend storage 150, e.g., when a "garbage collection" process changes the status of physical pages in backend storage 150 from in-used to empty.

SPU 120 of storage node 200 may include one or more microprocessors, microcontrollers, and coprocessors with interface hardware for: communication with a host, e.g., a host server in which SPU 120 is installed; communication with other storage systems, e.g., other SPUs 120 forming a storage cluster; and controlling or accessing backend storage 150. SPU 120 further includes volatile or non-volatile memory that may store programming, e.g., machine instructions implementing modules 142, 144, 146, 147, and 148 for I/O processing, garbage collection, and other services such as data compression and decompression, encryption and decryption, or deduplication. Memory of SPU 120 may also store metadata 130 that SPU 120 maintains and uses when providing storage services.

I/O processor 142, garbage collection module 144, compression and decompression module 146, encryption and decryption module 147, and deduplication module 148 may be implemented in SPU 120, for example, as separate modules employing separate hardware in SPU 120 or may be software or firmware modules that are executed by the same microprocessor or different microprocessors in SPU 120. Garbage collection module 144, compression and decompression module 146, and deduplication module 148 for storage services may perform processes that are transparent to and unseen by storage clients.

I/O processing module 142 may be part of the interface that exports virtual volumes V and possibly snapshot sets S1 to SM to storage clients, and I/O processor 142 may be configured to perform I/O operations such as write operations storing data and read operations retrieving data in backend storage 150 that logically correspond to blocks or pages in virtual volumes V. Metadata 130, particularly databases or indexes 132, 134, and 136, are used to track where blocks or pages of virtual volumes V or snapshot sets S1 to SM may be found in backend storage 150. I/O processor 142 may also maintain one or more generation numbers 131 as part of metadata 130. In one example, I/O processor 142 maintains a global generation number for the entire storage node 200, e.g., all virtual volumes V. In another example, I/O processor 142 maintains multiple generation numbers respectively for virtual volumes V. I/O processor 142 may change, e.g., increment, a generation number for a virtual volume V for each write or change of the data of the volume V. In one example, each write or other operation changing any volume V may be assigned a generation number corresponding to the current value of the generation number for that volume V at the time that SPU 120 performs the write or other operation, and the generation number is incremented to its next value for the next write operation.

Garbage collection module 144 detects and releases storage locations in backend storage 150 that was allocated to store data for one or more of volumes V but that now stores data that is no longer needed for any of volumes V or snapshots S1 to SM. Garbage collection module 144 may perform garbage collection as a periodically performed process or a background process or may perform garbage collection in response to a triggering event, e.g., when available storage in backend storage is low. In some examples of the present disclosure, garbage collection module 144 may look at each stored page and determine whether any generation number associated with the stored page falls in any of the required ranges of any volumes V or any snapshots in synchronized snapshot sets S1 to SM. If a stored page is associated with a generation number in a required range, garbage collection module 144 leaves the page untouched. If not, garbage collection module 144 deems the page as garbage, reclaims the page in backend storage 150, making the page available for storage of new data, and updates indexes 132, 134, and 136 in metadata 130.

Compression and decompression module 146 may compress data for writing to backend storage 150 and decompress data retrieved from backend storage 150. Data compression and decompression can thus reduce the required storage capacity that backend storage 150 requires to support the allocated volumes V and snapshot sets S1 to SM. Deduplication module 148 can similarly improve storage efficiency by detecting duplicate data already stored in backend storage 150 and preventing writing of duplicate data in multiple locations in backend storage 150. Instead, deduplication module 148 can update indices 132, 134, and 136, so that the volume, offset, and generation number of the new write are mapped to the address of the already stored data pattern in backend storage 150.

I/O processor 142, garbage collection module 144, compression and decompression module 146, encryption and decryption module 147, and deduplication module 148 share or maintain databases or indexes 132, 134, and 136 in metadata 130, e.g., in a non-volatile portion of the memory in SPU 120. For example, I/O processor 142 may use data index 132 during write operations to record a mapping between addresses or offsets in virtual volumes V and physical storage locations in backend storage 150, and I/O processor 142 may use a mapping that data index 132 provides during a read operation to identify where a page of any virtual volume V or S1 to SM is stored in backend storage 150. Data index 132 may be any type of database but in the illustrated embodiment is a key-value store containing key-value entries or pairs 133. The key in each key-value pair 133 includes an identifier of a volume and an offset within the volume and includes a generation number of an operation that wrote to the offset within the volume. The value in each key-value pair 133 includes the location in backend storage 150 storing the data corresponding to the generation number from the key and includes a deduplication signature for the data at the location in backend storage 150. Data index 132 may be any type of database but in one example data index 132 is a key-value database including a set of entries 133 that are key-value pairs.

Reference index 134 and deduplication index 136 may be maintained and used with data index 132 for deduplication processes and garbage collection processes. Reference index 134 may be any type of database but in the illustrated example reference index 134 is also a key-value store including key-value entries or pairs 135. The key in each key-value pair 135 includes a signature for data, an identifier of a virtual storage location for a write of the data, and a generation number for the write, and the value in each key-value pair 135 includes an identifier of a virtual storage location and a generation number for an "initial" write of the same data. In one implementation, each identifier of a virtual storage location includes a volume ID identifying the virtual volume and an offset to a page in the virtual volume. The combination of a signature of data and the volume ID, the offset, and the generation number of the initial write of the data can be used as a unique identifier for a data pattern available in storage node 200. Deduplication index 136 may be any type of database but in the illustrated example is a database including entries 137 that are key-value pairs 137. In particular, each entry 137 corresponds to a key including a signature or other identifier for a data pattern available in storage node 200 and a value indicating a physical location of the data pattern in backend storage 150.

Figure 3:
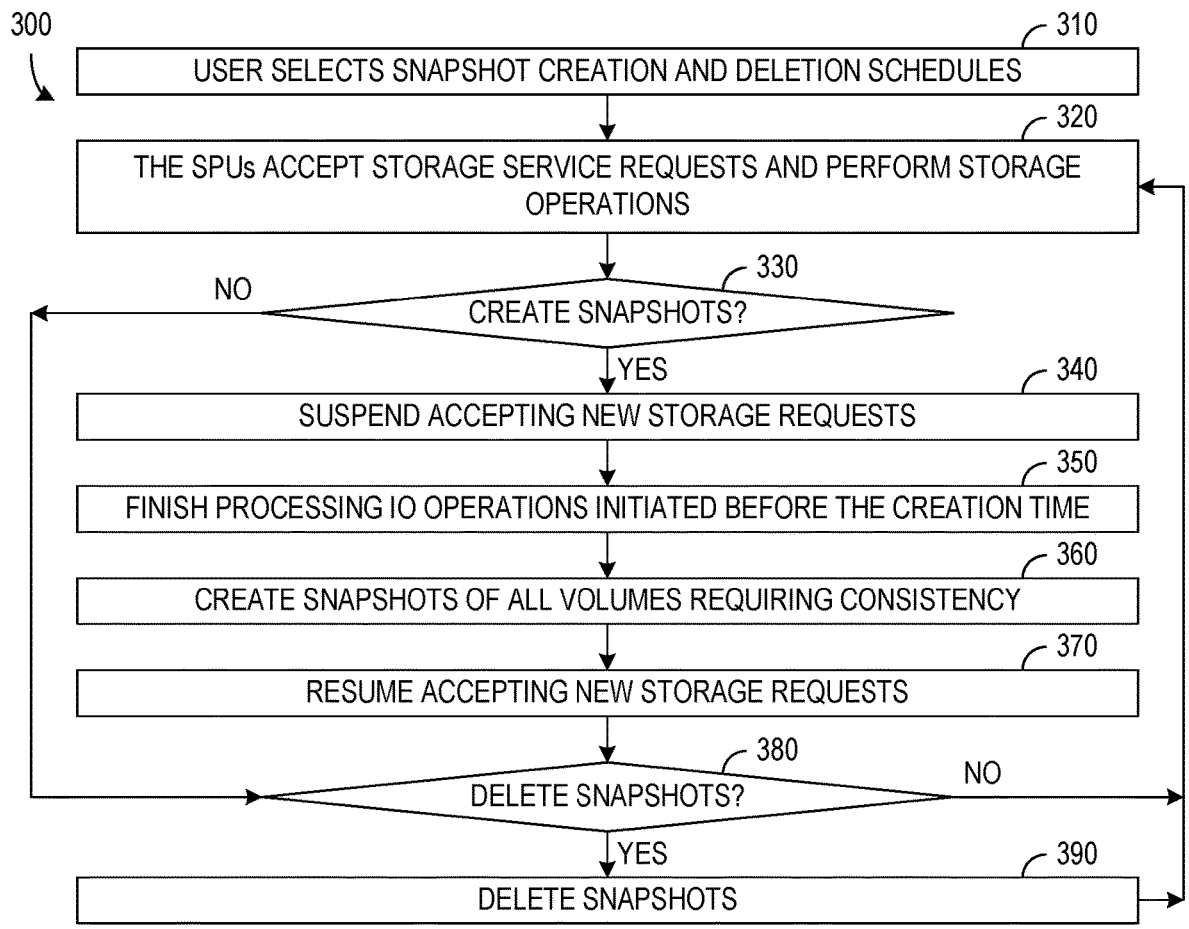
FIG. 3 is a flow diagram of a process for creating and deleting consistent snapshots in a cluster storage system in accordance with an example of the present disclosure.

FIG. 3 shows a flow diagram of a process 300 for capturing a synchronized and consistent set of snapshots in a cluster storage system in accordance with an example of the present disclosure. In process 300, a user or administrator of the storage system in a scheduling process 310 selects schedules for creation or deletion of synchronized snapshot sets. For example, an administrator may schedule creation of monthly, weekly, daily, and more frequent snapshots and may schedule for each monthly, weekly, daily, or more frequent snapshot to be deleted after a user-selected snapshot lifetime, e.g., deleting each daily snapshot a week after the snapshot was created, deleting each weekly snapshot two months after the snapshot was create. Similarly, more frequent snapshots, e.g., synchronized snapshot sets created hourly or every half or every quarter hour, may be scheduled for automatic deletion after a user-selected snapshot lifetime, e.g., after one or more hours.

The SPUs in the storage platform perform a storage service process 320 in which the SPUs accept storage requests from storage clients and perform storage operations to fulfill the storage requests as normal. During storage service process 320, each SPU may check the current time until a time T when snapshots are scheduled to be created or deleted. Alternatively, an SPU or other device in the storage platform may act as a coordinator and when the time T for a synchronized snapshot set is reached, the coordinator SPU may instruct all SPUs in the storage platform to snapshot all their volumes V. A protocol such as Network Time Protocol (NTP) may be used in the network, e.g., network 166 in FIG. 1, connecting the SPUs, so that times in the SPUs are synchronized to within an acceptable tolerance.

NTP is a networking protocol for clock synchronization between network devices on a packet-switched, variable-latency data network. NTP intends to synchronize all participating network devices to within a few milliseconds. NTP may use the intersection algorithm, i.e., a modified version of Marzullo's algorithm, to select time servers and is designed to mitigate the effects of variable network latency. NTP can under ideal conditions synchronize network devices to about one millisecond or better accuracy in a local area network. NTP may be implemented under a client-server model, e.g., with one SPU acting as a coordinator, but can alternatively be used in peer-to-peer relationships where peers consider the other network devices to be potential time sources. Some implementations of NTP send and receive timestamps using the User Datagram Protocol (UDP) and can also use broadcasting or multicasting, where clients passively listen to time updates after an initial round-trip calibrating exchange.

Each SPU, upon determining in a decision process 330 that it is currently a time T for taking a scheduled set of snapshots, performs a suspension process 340 that stops the SPU from accepting new storage service requests and then a completion process 350 in which the SPU complete all storage requests having a time stamp before time T at least in all volumes that need to be consistent. Once I/O operations initiated before time T are complete, each SPUs performs a synchronized snapshot process 360 to snapshot all volumes that the SPU owns or maintains. Since new storage service requests were suspended, all the snapshots taken by the SPU will be consistent, i.e., no storage operations will be performed between any two snapshots in the synchronized set of snapshots.

Since all SPUs in the storage platform initial initiate their snapshot processes 360 at the same time T within an acceptable tolerance, a system-wide synchronized snapshot is taken. The times at which different SPUs snapshot their volumes may correspond to same time T in the snapshot schedule but may differ slightly, e.g., by about a millisecond if NTP is used to synchronize the SPUs. Accordingly, to further reduce the chance of inconsistencies between snapshots, the storage platform may be configured such that volumes that could be subject to dependent writes are always owned by the same SPU and therefore are always consistent. An SPU may nearly instantaneously create each snapshot by assigning to the snapshot the current generation number for the underlying volume and configuring garbage collection for the volume to preserve, for each page of the volume, the write data that was written to the page and that has the most recent generation number that is less than or equal to the generation number of the snapshot. The creation of snapshots may be accomplished using metadata structures, e.g., view data structures 139 in metadata 130 of FIG. 2. U.S. Pat. App. Pub. No. 2021/0224161, entitled "Efficient IO Processing in a Storage System with Instant Snapshot, XCopy, and Unmap Capabilities," further discloses systems and methods for instant snapshot operations and is hereby incorporated by reference in its entirety.

Each SPU can perform a process 370 to resume accepting new storage service requests after snapshot process 360 is complete. If a decision process 380 determines any snapshot is to be deleted, a process 390 reconfigures garbage collection, e.g., changes the view data structures 139 in metadata 130 of FIG. 1, to remove or garbage collect every page that was being preserved solely for the snapshot being deleted. Each SPU may resume normal operation, e.g., process 320, any time after the synchronized snapshot set was captured.

Figure 4:
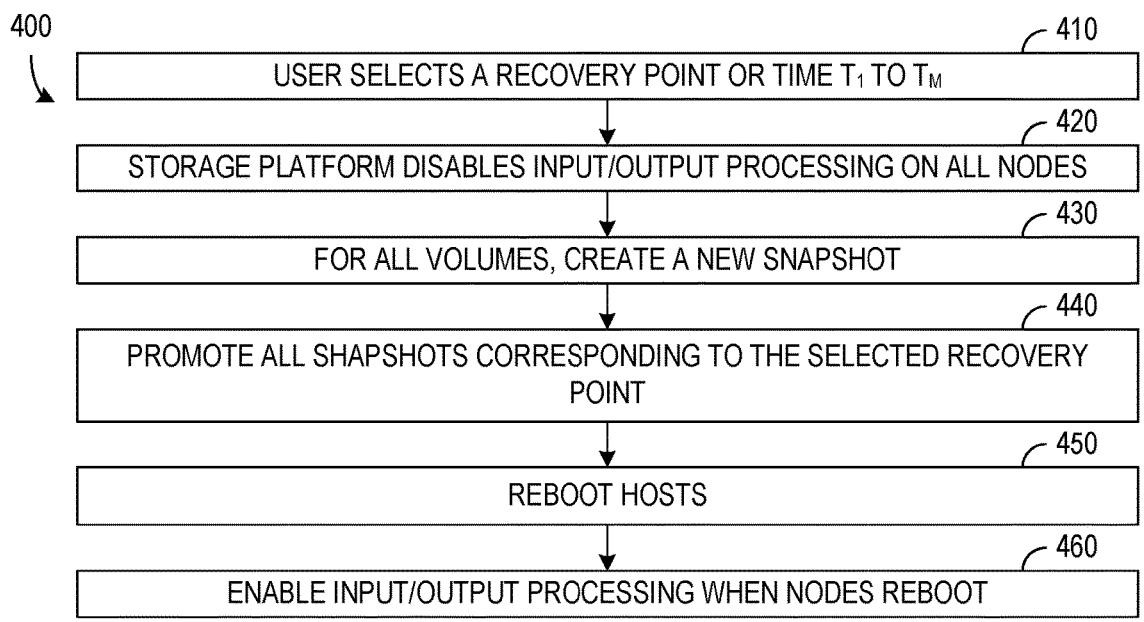
FIG. 4 is a flow diagram of a recovery process for a cluster storage system in accordance with an example of the present disclosure.

Process 300 operating on a storage node such as storage node 200 of FIG. 2 can, over time, create one or more sets of synchronized snapshots S1 to SM corresponding to different times $T_1$ to $T_M$ with each synchronized snapshot set S1 to SM containing snapshots of every volume V that the storage node owns or maintains. A recovery process 400 as shown in the flow diagram of FIG. 4 can use synchronized snapshot sets S1 to SM, which exist in every storage node in the cluster storage system, to restore the entire storage system to a consistent state corresponding to any of times $T_1$ to $T_M$. For process 400, a user or administrator in a process 410 picks from among the available times $T_1$ to $T_M$ a recovery point RP1 to which the storage system will be restored.

The storage system in a process 420 then turns off I/O processing on all the nodes of the clustered storage system, e.g., each SPU stops accepting new storage service requests. Each SPU in the storage system may then perform a snapshot process 430 to create a new synchronized snapshot of all the volumes that the SPU owns or maintains. The new synchronized snapshot set corresponds as a new possible recovery point RP2.

A process 440 promotes all the snapshots from the synchronized snapshot sets constituting recovery point RP1. The promotes roll back the contents of the base volumes to the contents of their snapshots from the synchronized sets of the recovery point RP1. In particular, for each snapshot corresponding to recovery point RP1, the entire contents of the snapshot are copied onto the entire address range of the base volume of the snapshot. In the system described herein, this promote operation may be accomplished by altering metadata, e.g., view data structures 139 in metadata 130 of FIG. 2, so that after the promote read operations avoid data having a generation number between the generation number of the promoted snapshot and the generation number when the promote operation was performed.

In a process 450, the storage system can either cause the attached hosts, e.g., servers 110 in FIG. 1, to reboot if such a provision is enabled or prompt the user to reboot the host servers. The host servers may then reboot from the restored boot volumes, e.g., from volumes Vu in FIG. 1. Once the storage system or SPUs detect the host reboot, a process 460 reenables I/O processing with the storage system being in the state of recovery point RP1.

Process 400 may be orchestrated on all the storage nodes constituting the clustered storage system, while process 400 is fast and reliable and does not involve any data movement or restoration from tape or in backend storage or other physical storage devices. Process 400 also allows the user to undo the recovery process and restore the storage system to the way the storage system was at the time of the corruption, if the user chooses to do so. The user may simply initiate recovery process 400 again, following process steps 410 to 460 as described above, but this time, the user chooses recovery point RP2 in selection process 410.

The systems and methods detailed here may nearly-instantaneously restore storage to a recovery point of the user's choice. Users can restore their compromised storage system to a consistent state very fast with this mechanism. Thus, users can recover their system much faster after a corruption or a malware attack (in a matter of minutes instead of hours or days).

Each of modules disclosed herein may include, for example, hardware devices including electronic circuitry for implementing the functionality described herein. In addition, or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A recovery process for a storage system comprising:
creating, for one or more recovery points, a plurality of snapshot sets respectively in a plurality of storage nodes of the storage system, each snapshot set of the snapshot sets corresponding to a recovery point of the one or more recovery points and containing snapshots of every volume that a storage node of the plurality of storage nodes owns or maintains;
assigning, for the one or more recovery points, a generation number to each snapshot in a corresponding snapshot set associated with a respective recovery point;
receiving, from a user of the storage system, a selection of a recovery point from the one or more recovery points;
suspending one or more storage services of the storage system;
in response to receiving the selection of the recovery point, in each storage node of the plurality of storage nodes, promoting the snapshots in the snapshot set corresponding to the recovery point selected by altering metadata associated with each storage node to point to respective data with a generation number in a range between a generation number at creation of the volumes and the generation number assigned to the selected recovery point;
rebooting the storage nodes; and
resuming the one or more storage services of the storage system.

2. The process of claim 1, wherein creating the snapshot sets comprises:
receiving, from the user of the storage system, a selection of a schedule for creation of the snapshot sets;
synchronizing the storage nodes to identify a first time in the schedule; and
creating, at the first time, the snapshot sets that correspond to a first of the recovery points, the first recovery point corresponding to a state of the storage system at the first time.

3. The process of claim 2, wherein creating the snapshot set further comprises:
causing the storage nodes to identify a second time in the schedule; and
at the second time, causing the storage nodes to create the snapshot sets that correspond to a second of the recovery points, the second recovery point corresponding to a state of the storage system at the second time.

4. The process of claim 2, wherein synchronizing the storage nodes comprises executing a Network Time Protocol (NTP) process on the storage nodes through a network interconnecting the storage nodes.

5. The process of claim 1, further comprising, after the suspending of the storage services, creating a plurality of new snapshot sets respectively in the storage nodes of the storage system, the new snapshot sets corresponding to a new recovery point and capturing a state of the storage system when the recovery process was performed.

6. The process of claim 1, wherein the creating of the snapshot sets respectively in the storage nodes of the storage system, consists of each of the storage nodes, without copying or moving data of the volumes, creating a metadata structure that prevents the storage node from deleting from the physical storage any of the data required for the snapshots.

7. The process of claim 6, wherein the promoting of the snapshots consists of each of the storage nodes, without copying or moving the data of the volumes in physical storage, modifying a metadata structure.

8. A cluster storage system comprising:
a plurality of storage nodes; and
a network interconnecting the storage nodes, wherein the storage nodes are configured to perform a process including:
creating, for one or more recovery points, a plurality of snapshot sets respectively in the storage nodes, each snapshot set of the snapshot sets corresponding to a recovery point of the one or more recovery points and containing snapshots of every volume that a storage node of the plurality of storage nodes owns or maintains;
assigning, for the one or more recovery points, a generation number to each snapshot in a corresponding snapshot set associated with a respective recovery point;
receiving a request to roll back the storage system to one of the one or more recovery points selected by a user of the cluster storage system from the one or more recovery points;
suspending storage services of the storage system;
in response to receiving the selection of the recovery point, in each storage node of the plurality of storage nodes, promoting the snapshots in the snapshot set corresponding to the recovery point selected by altering metadata associated with each storage node to point to respective data with a generation number in a range between a generation number at creation of the volumes and the generation number assigned to the selected recovery point;
rebooting the storage nodes; and
resuming the storage service of the storage system.

9. The cluster storage system of claim 8, wherein each of the storage nodes comprises:
a server;
a backend storage device; and
a storage processing unit resident in the server and connected to control the backend storage to provide the storage services that target any of the volumes that the storage node owns or maintains.

10. The cluster storage system of claim 9, wherein in each storage node, the storage processing unit comprises a card plugged into a bus of the server.

11. The cluster storage system of claim 8, wherein the cluster storage system is configured to synchronize the storage nodes by executing a Network Time Protocol (NTP) process through the network interconnecting the storage nodes.

12. A system comprising:
at least one processor; and
a memory coupled to the at least one processor, the memory storing instructions that, when executed by the at least one processor, cause the system to perform steps comprising:
creating, for one or more recovery points, a plurality of snapshot sets respectively in a plurality of storage nodes of the storage system, each snapshot set of the snapshot sets corresponding to a recovery point of the one or more recovery points and containing snapshots of every volume that a storage node of the plurality of storage nodes owns or maintains;
assigning, for the one or more recovery points, a generation number to each snapshot in a corresponding snapshot set associated with a respective recovery point;
receiving, from a user of the storage system, a selection of a recovery point from the one or more recovery points selecting one of the one or more recovery points;
suspending one or more storage services of the storage system;
in response to receiving the selection of the recovery point, in each storage node of the plurality of storage nodes, promoting the snapshots in the snapshot set corresponding to the recovery point selected by altering metadata associated with each storage node to point to respective data with a generation number in a range between a generation number at creation of the volumes and the generation number assigned to the selected recovery point;
rebooting the storage nodes; and
resuming the one or more storage services of the storage system.

13. The system of claim 12, wherein creating the snapshot sets comprises:
receiving, from the user of the storage system, a selection of a schedule for creation of the snapshot sets;
synchronizing the storage nodes to identify a first time in the schedule; and
creating, at the first time, the snapshot sets that correspond to a first of the recovery points, the first recovery point corresponding to a state of the storage system at the first time.

14. The system of claim 13, wherein creating the snapshot set further comprises:
causing the storage nodes to identify a second time in the schedule; and
at the second time, causing the storage nodes to create the snapshot sets that correspond to a second of the recovery points, the second recovery point corresponding to a state of the storage system at the second time.

15. The system of claim 13, wherein synchronizing the storage nodes comprises executing a Network Time Protocol (NTP) process on the storage nodes through a network interconnecting the storage nodes.

16. The system of claim 12, wherein the instructions cause the system to further perform steps comprising, after the suspending of the storage services, creating a plurality of new snapshot sets respectively in the storage nodes of the storage system, the new snapshot sets corresponding to a new recovery point and capturing a state of the storage system when the recovery process was performed.

17. The system of claim 12, wherein the creating of the snapshot sets respectively in the storage nodes of the storage system, consists of each of the storage nodes, without copying or moving data of the volumes, creating a metadata structure that prevents the storage node from deleting from the physical storage any of the data required for the snapshots.

18. The system of claim 12, wherein the promoting of the snapshots consists of each of the storage nodes, without copying or moving the data of the volumes in physical storage, modifying a metadata structure.

* * * * *